US012627451B2

(12) United States Patent
Zhao et al.

(10) Patent No.: US 12,627,451 B2
(45) Date of Patent: May 12, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Zhi Zhang, Dongguan (CN); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 668 days.

(21) Appl. No.: 17/992,751

(22) Filed: Nov. 22, 2022

(65) Prior Publication Data

US 2023/0080770 A1 Mar. 16, 2023

Related U.S. Application Data

(63) Continuation of application No. PCT/CN2020/091886, filed on May 22, 2020.

(51) Int. Cl.
*H04L 5/00* (2006.01)
*H04L 1/00* (2006.01)
*H04W 16/14* (2009.01)

(52) U.S. Cl.
CPC .......... *H04L 5/0055* (2013.01); *H04L 1/0071* (2013.01); *H04L 5/0053* (2013.01); *H04W 16/14* (2013.01)

(58) Field of Classification Search
CPC .................................................... H04L 5/0055
See application file for complete search history.

(56) References Cited

U.S. PATENT DOCUMENTS

| | | | |
|---|---|---|---|
| 2019/0110325 A1 | 4/2019 | Gulati et al. | |
| 2019/0268971 A1 | 8/2019 | Talarico et al. | |
| 2021/0029731 A1* | 1/2021 | Kundu ................ | H04W 74/004 |
| 2021/0250214 A1* | 8/2021 | Wagner ............... | H04L 27/2607 |
| 2023/0049344 A1* | 2/2023 | Choi ......................... | H04L 1/20 |
| 2023/0136864 A1* | 5/2023 | Lei ......................... | H04L 5/0055 |
| | | | 370/329 |

FOREIGN PATENT DOCUMENTS

| | | |
|---|---|---|
| CN | 109155710 A | 1/2019 |
| CN | 110830172 A | 2/2020 |
| CN | 111132036 A | 5/2020 |
| WO | WO2020/091492 A1 | 5/2020 |
| WO | WO2021232425 A1 | 11/2021 |

OTHER PUBLICATIONS

Guangdong OPPO Mobile Telecommunications Corp., Ltd . . . International Search Report and Written Opinion, PCT/CN2020/091886, Feb. 18, 2021, 15 pgs.
Guangdong OPPO Mobile Telecommunications Corp., Ltd., Extended European Search Report, EP20936492.6, May 30, 2023, 7 pgs.

* cited by examiner

*Primary Examiner* — Jason E Mattis
(74) *Attorney, Agent, or Firm* — Morgan, Lewis & Bockius LLP

(57) ABSTRACT

A wireless communication method and a terminal device. A first terminal can send feedback information on a plurality of PRBs of an unlicensed frequency band, so that the feedback information occupies a certain proportion of channel bandwidth in a frequency domain to ensure the normal transmission of the feedback information, and realize the use of sidelink communication in the unlicensed frequency band.

14 Claims, 5 Drawing Sheets

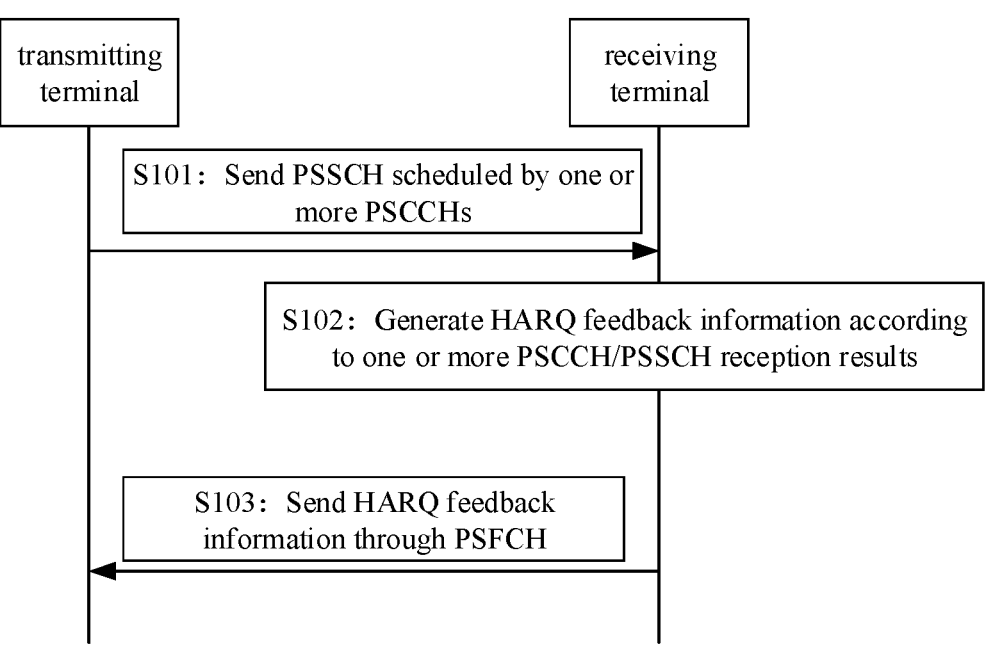
Fig. 1
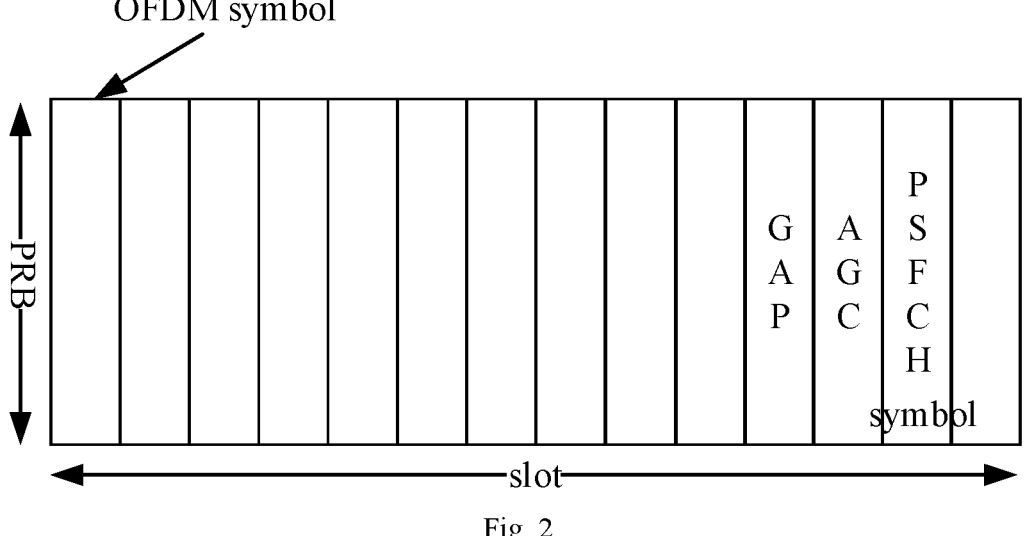
Fig. 2
sidelink communication
Fig. 3

First
Terminal

Second
Terminal

S501: Send feedback information on a
plurality of PRBs in an unlicensed
frequency band

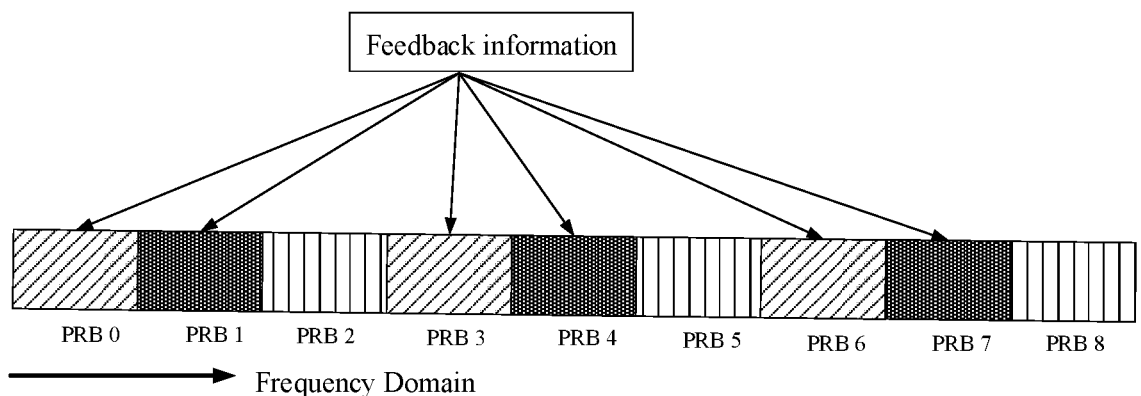
Fig. 9
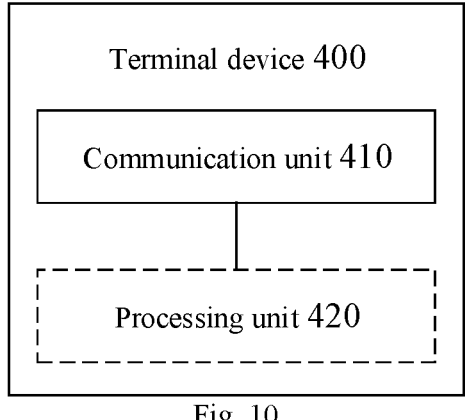
Fig. 10
Fig. 11

WIRELESS COMMUNICATION METHOD AND TERMINAL DEVICE

CROSS-REFERENCE TO RELATED APPLICATION(S)

The present application is a continuation application of PCT Application No. PCT/CN2020/091886, entitled "WIRELESS COMMUNICATION METHOD AND TERMINAL DEVICE" filed on May 22, 2020, the entire disclosure of which is incorporated herein as a part of the present application for all purposes.

TECHNICAL FIELD

Embodiments of the present disclosure relate to the field of communication, and more particularly, to a wireless communication method and a terminal device.

BACKGROUND

New Radio (NR) Vehicle to Everything (V2X) supports a Hybrid Automatic Repeat Request (HARQ) feedback from a receiving terminal to a transmitting terminal. Specifically, FIG. 1 is a schematic diagram of a sidelink HARQ feedback process provided by the present application. As shown in FIG. 1, in S101, the transmitting terminal sends a Physical Sidelink Shared Channel (PSSCH) scheduled by one or more Physical Sidelink Control Channels (PSCCHs) to the receiving terminal; in S102, the receiving terminal generates HARQ feedback information according to one or more PSCCH/PSSCH reception results; and in S103, the receiving terminal sends the HARQ feedback information to the transmitting terminal through a Physical Sidelink Feedback Channel (PSFCH). With the HARQ feedback information, the transmitting terminal can dynamically adjust the number of retransmissions of a data block, which facilitates to improve utilization of a radio resource and reliability of the data transmission.

When sidelink communication operates in an unlicensed frequency band, any feedback information sent by the terminal, such as the above-mentioned HARQ feedback information, needs to occupy more than 80% of a channel bandwidth in frequency domain. Otherwise, devices operating in the same unlicensed frequency band will likely perform channel monitoring on the current time-frequency resource, and consider that the next time-frequency resource meets a resource selection condition. This will eventually lead to a plurality of devices sending information on the same time-frequency resource, causing serious mutual interference. However, in the prior art, the PSFCH only occupies one Physical Resource Block (PRB) in frequency domain, and one PRB is typically less than 80% of the channel bandwidth, thereby resulting in the failure of the above mentioned sidelink communication to be applied to the unlicensed frequency band.

SUMMARY

Embodiments of the present disclosure provide a wireless communication method and a terminal device. By sending feedback information to a second terminal on a plurality of PRBs in an unlicensed frequency band, the feedback information occupies a certain proportion of a channel bandwidth in frequency domain, thereby ensuring normal transmission of the feedback information, and realizing an application of sidelink communication on the unlicensed frequency band.

In a first aspect, there is provided a wireless communication method, and the method includes: sending, by a first terminal, feedback information to a second terminal on a plurality of Physical Resource Blocks (PRBs) in an unlicensed frequency band.

In a second aspect, there is provided a wireless communication method, and the method includes: receiving, by a second terminal, feedback information sent by a first terminal on a plurality of Physical Resource Blocks (PRBs) in an unlicensed frequency band.

In a third aspect, there is provided a terminal device, configured to perform the method in the first aspect or each implementation thereof as described above. Specifically, the terminal device includes functional modules configured to perform the method in the first aspect or each implementation thereof as described above.

In a fourth aspect, there is provided a terminal device, configured to perform the method in the second aspect or each implementation thereof as described above. Specifically, the terminal device includes functional modules configured to perform the method in the second aspect or each implementation thereof as described above.

In a fifth aspect, there is provided a terminal device, including a processor and a memory. The memory is configured to store a computer program, and the processor is configured to call and run the computer program stored in the memory to perform the method in the first aspect or each implementation thereof as described above.

In a sixth aspect, there is provided a terminal device, including a processor and a memory. The memory is configured to store a computer program, and the processor is configured to call and run the computer program stored in the memory to perform the method in the second aspect or each implementation thereof as described above.

In a seventh aspect, there is provided an apparatus for implementing the method in any one of the first aspect to the second aspect or each implementation thereof as described above.

Specifically, the apparatus includes: a processor, configured to call and run a computer program from a memory, so that a device installed with the apparatus performs the method in any one of the first aspect to the second aspect or each implementation thereof as described above.

In an eighth aspect, there is provided a computer-readable storage medium, configured to store a computer program that causes a computer to perform the method in any one of the first aspect to the second aspect or each implementation thereof as described above.

In a ninth aspect, there is provided a computer program product, including computer program instructions, which cause the computer to perform the method in any one of the first aspect to the second aspect or each implementation thereof as described above.

In an eleventh aspect, there is provided a computer program which, when run on a computer, causes the computer to perform the method in any one of the first aspect to the second aspect or each implementation thereof as described above.

Through the technical solutions in the first aspect and the second aspect, the feedback information is sent to the second terminal on the plurality of PRBs in the unlicensed frequency band, so that the feedback information occupies a certain proportion of the channel bandwidth in frequency domain, thereby ensuring the normal transmission of the feedback information, and realizing the application of the sidelink communication on the unlicensed frequency band.

BRIEF DESCRIPTION OF THE DRAWINGS

FIG. 1 is a schematic diagram of a sidelink HARQ feedback process provided by the present disclosure;

FIG. 2 is a schematic diagram of a time-frequency domain position of a PSFCH supported in NR V2X provided by the present disclosure;

FIG. 3 is a scenario diagram without a central control node provided by the present disclosure;

FIG. 9 is a schematic diagram of feedback information occupying an interleaved resource provided by the present disclosure;

FIG. 10 shows a schematic block diagram of a terminal device 400 according to an embodiment of the present disclosure;

FIG. 11 shows a schematic block diagram of a terminal device 500 according to an embodiment of the present disclosure;

DETAILED DESCRIPTION

Figures 4, 5:
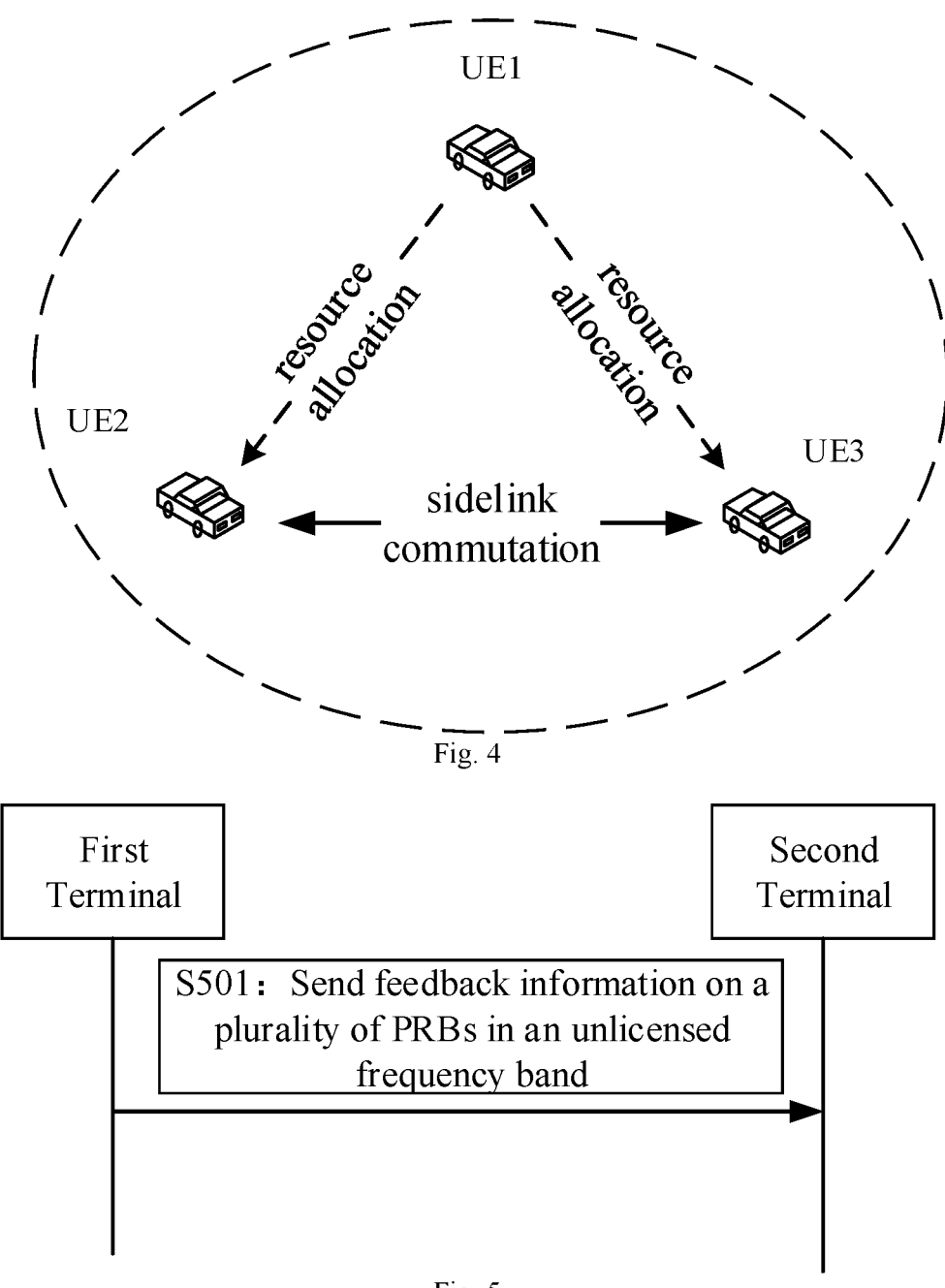
FIG. 4 is a scenario diagram with a central control node provided by the present disclosure.
FIG. 5 is a schematic flowchart of a wireless communication method according to an embodiment of the present disclosure.

The technical solutions in embodiments of the present disclosure will be described below in combination with the drawings in embodiments of the present disclosure. Obviously, the described embodiments are part of embodiments of the present disclosure, rather than all the embodiments. For embodiments in the present disclosure, all other embodiments acquired by a person of ordinary skill in the art without creative work shall fall in the protection scope of the present disclosure.

In a NR V2X system, sidelink communication is mainly composed of a PSCCH, a PSSCH, a Physical Sidelink Broadcast Channel (PSBCH) and a PSFCH. The first three channels have existed in Long Term Evolution (LTE)-V2X, and the PSFCH is newly introduced in NR V2X to support HARQ transmission. FIG. 2 is a schematic diagram of a time-frequency domain position of a PSFCH supported in NR V2X provided by the present disclosure. As shown in FIG. 2, the PSFCH occupies one PRB in frequency domain, and occupies one Orthogonal Frequency Division Multiplexing (OFDM) symbol in time domain, which symbol may be referred to as a PSFCH symbol. A physical signal sent by a previous OFDM symbol of the PSFCH is the same as the PSFCH symbol, which is used to assist a transmitting terminal in performing Automatic Gain Control (AGC), and a previous OFDM symbol of the OFDM symbol used to carry AGC is used for receive-transmit conversion between the transmitting terminal and a receiving terminal, which previous OFDM symbol is referred to as a receive-transmit conversion (or GAP) symbol. The maximum capacity of PSFCH in NR V2X is 1 bit, which is carried by a Zadoff-Chu (ZC) sequence with a length of 12.

It should be noted that embodiments of the present disclosure are not only applicable to a V2X communication framework, but also applicable to any terminal-to-terminal communication framework, such as Vehicle to Vehicle (V2V), Device to Device (D2D), etc., which is not limited by the present disclosure. Embodiments of the present disclosure are applied to an unlicensed spectrum, and the unlicensed spectrum may also be referred to as a grant-free spectrum.

Different from a traditional cellular system in which communication data is received or sent through a network device, the sidelink communication has higher spectral efficiency and lower transmission delay. An Internet of Vehicle system adopts a terminal-to-terminal direct communication method, and two transmission modes are defined in the 3rd Generation Partnership Project (3GPP): a first mode and a second mode.

In the first mode, a transmission resource of the terminal is allocated by the network device, and the terminal sends data on a sidelink according to the resource allocated by the network device. The network device can allocate the resource for a single transmission to the terminal, or can allocate a semi-static transmission resource to the terminal.

In the second mode, the terminal selects a resource from a resource pool for data transmission. The second mode can be further divided into a scenario without a central control node and a scenario with a central control node according to whether there is a central control node of a non-network device type.

Exemplarily, FIG. 3 is a scenario diagram without a central control node provided by the present disclosure. As shown in FIG. 3, a sidelink communication resource between the transmitting terminal and the receiving terminal is autonomously selected by the transmitting terminal from a specific resource pool. FIG. 3 exemplarily shows two terminals, and optionally, the scenario may include more terminals, which is not limited by embodiments of the present disclosure.

FIG. 4 is a scenario diagram with a central control node provided by the present disclosure. As shown in FIG. 4, for the sidelink communication with a central control node, a plurality of terminals form a communication group, and the communication group has a central control node that may also be called a Cluster Header (CH), and other terminals are called Cluster Members (CMs). The central control node has one of the following functions: being responsible for establishing a communication group; being responsible for joining and leaving of a group member; performing resource coordination, allocating a sidelink transmission resource for other terminals, and receiving sidelink feedback information from other terminals; performing resource coordination with other communication groups, and the like. In the present disclosure, a transmission between the CH and the CM is called a HM link, and a transmission between the CM and the CH is called a MH link. FIG. 4 exemplarily shows two CMs and one CH, and optionally, the scenario may include a CM and a CH, which is not limited by embodiments of the present disclosure.

It should be understood that the terms "system" and "network" herein may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "I" herein generally indicates that proceeding and following objects associated thereby are in an "or" relationship.

The terminal in embodiments of the present disclosure may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc. The terminal may be a station (ST) in the WLAN. Alternatively, the terminal device may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing devices connected to a wireless modem, a vehicle-mounted device, a wearable device, or a terminal in a next generation communication system, such as a terminal in an NR network or a terminal device in a future evolved Public Land Mobile Network (PLMN).

By way of example and not limitation, in embodiments of the present disclosure, the terminal may be a wearable device. The wearable device may also be called a wearable intelligent device, which is a general term of wearable devices designed intelligently and developed on daily wear using wearable technology, such as glasses, gloves, a watch, clothing and shoes. The wearable device is a portable device that is worn directly on a body or integrated into a user's clothes or accessories. The wearable device is not only a hardware device, but also implements powerful functions through software support, data interaction and cloud interaction. Generalized wearable intelligent device include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign observations.

The network device may be a device for communicating with a mobile device, or may be an Access Point (AP) in WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device or base station (gNB) in the NR network, or a network device in the future evolved PLMN network.

As mentioned above, when the sidelink communication operates in an unlicensed frequency band, any feedback information sent by the terminal needs to occupy more than 80% of a channel bandwidth in frequency domain. Otherwise, devices operating on the same unlicensed frequency band will likely perform channel monitoring on the current time-frequency resource, and consider that the next time-frequency resource meets a resource selection condition, which will eventually lead to a plurality of devices sending information on the same time-frequency resource, thus causing serious mutual interference. However, in the prior art, the PSFCH only occupies one PRB in frequency domain, and one PRB is typically less than 80% of the channel bandwidth, thereby resulting in the failure of the sidelink communication to be applied to the unlicensed frequency band.

In order to solve the above technical problems, the present disclosure provides a scheme for feedback information transmission. The inventive concept of the present disclosure is to send the feedback information through a plurality of PRBs in the unlicensed frequency band. That is, the feedback information occupies a certain proportion of the channel bandwidth in frequency domain, so that a plurality of devices do not send signals on the same time-frequency resource, thereby ensuring normal transmission of the feedback information, and realizing the application of the sidelink communication on the unlicensed frequency band.

The technical solutions of the present disclosure are described in detail below through specific embodiments.

FIG. 5 is a schematic flowchart of a wireless communication method according to an embodiment of the present disclosure. As shown in FIG. 5, the method 500 may include but is not limited to the following contents.

In step S501, a first terminal sends feedback information to a second terminal on a plurality of PRBs in an unlicensed frequency band.

In some embodiments, the first terminal and the second terminal are any two terminals in the foregoing first mode. Alternatively, the first terminal and the second terminal are any two terminals in the scenario without the central control node. Alternatively, the first terminal and the second terminal are any two terminals in the scenario with the central control node, and the terminals here are not the central control node. Alternatively, the first terminal is any terminal in the scenario with the central control node, and the second terminal is the central control node in the scenario with central control node.

In some embodiments, the feedback information in step S501 includes: HARQ feedback information and/or Channel State Information (CSI) information, which is not limited to this.

Exemplarily, before step S501, the transmitting terminal sends the PSSCH scheduled by one or more PSCCHs to the first terminal. Based on this, the first terminal generates the HARQ feedback information according to one or more PSCCH/PSSCH reception results. It should be noted that the transmitting terminal here refers to a terminal that sends the PSSCH. If the second terminal mentioned above is an ordinary terminal, the transmitting terminal here may be understood as the second terminal. If the second terminal mentioned above is the central control node, the transmitting terminal here is different from the second terminal. The first terminal is also called a receiving terminal, and the receiving terminal is used to receive the PSSCH.

If the first terminal successfully receives the PSSCH sent by the transmitting terminal, the first terminal feeds back a HARQ Acknowledgment (ACK) to the second terminal. If the first terminal fails to receive the PSSCH sent by the transmitting terminal, the first terminal feeds back a HARQ Negative Acknowledgement (NACK) to the second terminal. Further, the second terminal may determine whether to perform retransmission according to the HARQ feedback information.

Exemplarily, before step S501, the transmitting terminal may send a sidelink reference signal, such as a Channel State Information Reference Signal (CSI-RS), to the first terminal, and the first terminal performs measurement according to the CSI-RS and feeds back Channel State Information (CSI) (including a Channel Quantity Indicator (CQI), a Rank Indication (RI), a Precoding Matrix Indicator (PMI), etc.) to the transmitting terminal. The transmitting terminal may select a transmission parameter, such as a Modulation and Coding Scheme (MCS), according to the CSI fed back by the receiving terminal.

In some embodiments, the feedback information in step S501 is carried by a symbol sequence, for example, by a ZC sequence. Different feedback information is carried by different symbol sequences. For example, HARQ ACK and HARQ NACK may be carried by two different ZC sequences. Alternatively, different feedback information is carried by the same ZC sequence that is subject to different cyclic shifts. For example, HARQ ACK and HARQ NACK may be carried by the same ZC sequence that is subject to different cyclic shifts.

In some embodiments, the feedback information in step S501 is carried by at least one modulation symbol. In this case, the modulation symbol needs to be sent simultaneously with a Demodulation Reference Signal (DMRS) to assist the first terminal in demodulation.

In some embodiments, the feedback information includes at least one feedback information bit, and the feedback information bit may be mapped into the at least one modulation symbol. A mapping relationship between the feedback information bit and the modulation symbol is related to the modulation mode as adopted. In the present disclosure, the modulation mode such as Binary Phase Shift Keying (BPSK), Quadrature Phase Shift Keying (QPSK), Quadrature Amplitude Modulation (16QAM) or Quadrature Amplitude Modulation (64QAM) may be used to modulate the feedback information.

In some embodiments, in the present disclosure, whether the feedback information is carried by the symbol sequence or carried by the at least one modulation symbol, the feedback information occupies one data symbol by default. The data symbol may be an Orthogonal Frequency Division Multiplexing (OFDM) symbol, and the OFDM symbol is taken as an example for illustration in the present disclosure. Alternatively, if the feedback information is configured to occupy a plurality of OFDM symbols, the feedback information sent on the plurality of OFDM symbols is exactly the same. In general, it is assumed that both the feedback information carried by the symbol sequence and the feedback information carried by the modulation symbol occupy only one OFDM symbol in the following description.

In some embodiments, a proportion, occupied by the plurality of PRBs used to transmit the feedback information, of the entire bandwidth is greater than or equal to 80%.

As mentioned above, in order to ensure the transmission of the feedback information in the unlicensed frequency band, a certain proportion of the channel bandwidth needs to be occupied in frequency domain. For this reason, the present disclosure proposes the following transmission methods for the feedback information.

In Possible Implementation 1, the feedback information is carried by one PRB, and the first terminal maps the feedback information onto the plurality of PRBs.

In some embodiments, if the feedback information is carried by the symbol sequence, a length of the symbol sequence is N. If the feedback information is carried by the at least one modulation symbol, the number of the at least one modulation symbol is N–M. N is the number of Resource Elements (REs) in one PRB, and M is the number of REs occupied by a DMRS in one PRB.

In some embodiments, if the feedback information is carried by the symbol sequence, the sequence carrying the feedback information is mapped onto the plurality of PRBs in one of the following ways.

Figure 6:
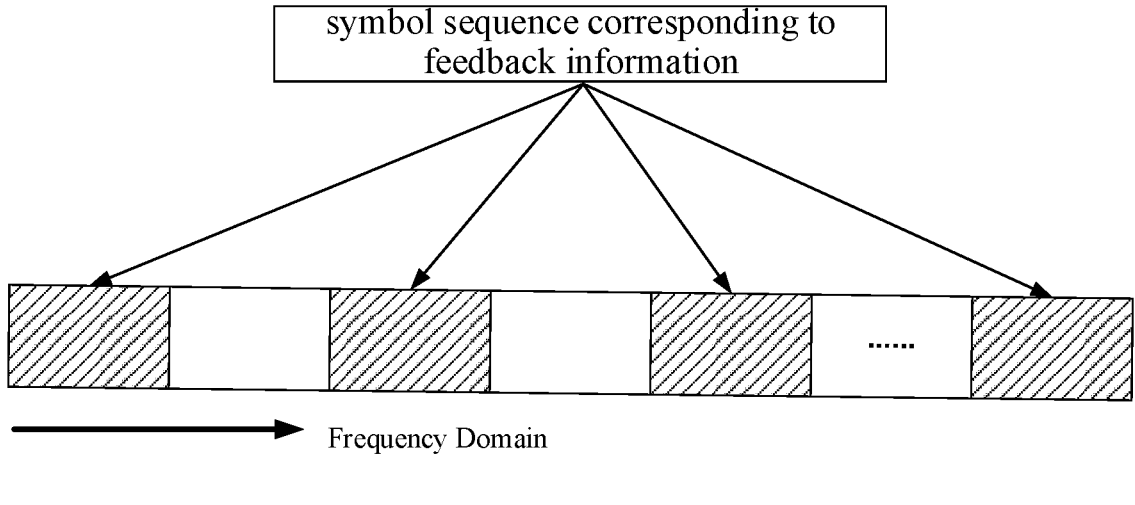
FIG. 6 is a schematic diagram of repeatedly mapping a symbol sequence to a plurality of PRBs provided by the present disclosure.
Figure 6:
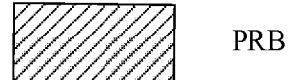

In a first way, the symbol sequence corresponding to the feedback information is repeatedly mapped to the plurality of PRBs. That is, as shown in FIG. 6. The i-th symbol in the symbol sequence is mapped to the i-th RE of the j-th PRB, where $0 \leq i < N$, $0 \leq j < F$, and F is the number of PRBs of the plurality of PRBs.

In a second way, the symbol sequence corresponding to the feedback information is subject to different cyclic shifts to obtain different cyclic shift sequences, and the different cyclic shift sequences are mapped onto different PRBs of the plurality of PRBs. Meanings represented by these different cyclic shift sequences on the different PRBs are the same. That is, the mod $(i+j^*\Delta,N)$-th symbol in an original symbol sequence is mapped to the i-th RE of the j-th PRB in the plurality of PRBs, where mod( ) is a remainder function, N, $0 \leq j < F$, i and j are both integers, and F, N have the same meanings as the above-mentioned F, N respectively, which will not be repeated in the present disclosure. A is a specific value.

In some embodiments, A is configured or preconfigured by the central control node or the network device, or predefined by a standard.

Exemplarily, if N=5, F=2, $\Delta$=2, a mapping situation of the original symbol sequence on two PRBs is described by Table 1 as below.

TABLE 1

| index of original symbol sequence | j | i |
|---|---|---|
| 0 | 0 | 0 |
| 1 | 0 | 1 |
| 2 | 0 | 2 |
| 3 | 0 | 3 |
| 4 | 0 | 4 |
| 2 | 1 | 0 |
| 3 | 1 | 1 |
| 4 | 1 | 2 |
| 0 | 1 | 3 |
| 1 | 1 | 4 |

It can be seen from Table 1 that the symbol sequence carried on PRB 0 is 0,1,2,3,4. The symbol sequence carried on PRB 1 is 2,3,4,0,1. The meaning represented by 0,1,2,3,4 on PRB 0 is the same as the meaning represented by 2,3,4,0,1 on PRB 1. For example, they both represent HARQ ACK.

In a third way, the symbol sequence corresponding to the feedback information is subject to a specific cyclic shift to obtain a specific cyclic shift sequence, and the specific cyclic shift sequence is mapped to different PRBs of the plurality of PRBs. The specific cyclic shift sequence has the same meaning on the different PRBs. That is, the mod$(i+\delta,N)$-th symbol in the symbol sequence is mapped to the i-th RE of the j-th PRB in the plurality of PRBs, where mod( ) is the remainder function, $0 \leq i < N$, $0 \leq j < F$, i and j are both integers, F is the number of PRBs of the plurality of PRBs, N is the length of the symbol sequence, and $\delta$ is a specific value.

In some embodiments, $\delta$ is configured or preconfigured by the central control node or the network device, or predefined by a standard.

Exemplarily, if N=5, F=2, $\delta$=2, the mapping situation of the original symbol sequence on two PRBs is described by Table 2 as below.

TABLE 2

| index of original symbol sequence | j | i |
|---|---|---|
| 2 | 0 | 0 |
| 3 | 0 | 1 |
| 4 | 0 | 2 |
| 0 | 0 | 3 |
| 1 | 0 | 4 |
| 2 | 1 | 0 |
| 3 | 1 | 1 |
| 4 | 1 | 2 |
| 0 | 1 | 3 |
| 1 | 1 | 4 |

It can be seen from Table 2 that the symbol sequence carried on PRB 0 is 2,3,4,0,1. The symbol sequence carried on PRB 1 is 2,3,4,0,1. The meaning represented by 2,3,4,0,1 on PRB 0 is the same as the meaning represented by 2,3,4,0,1 on PRB 1. For example, they both represent HARQ ACK.

Alternatively, the original symbol sequence is subject to the specific cyclic shift to obtain the specific cyclic shift sequence, and the specific cyclic shift sequence and the original symbol sequence are mapped to different PRBs of the plurality of PRBs. The original symbol sequence and the specific cyclic shift sequence have the same meaning on the different PRBs. For example, the original symbol sequence is 0,1,2,3,4, and the original symbol sequence is subject to one specific cyclic shift to obtain the specific cyclic shift sequence 2,3,4,0,1. 0,1,2,3,4 is transmitted on PRB 0, and 2,3,4,0,1 is transmitted on PRB 1. The meaning represented by 0,1,2,3,4 on PRB 0 and the meaning represented by 2,3,4,0,1 on PRB 1 are both HARQ ACK.

In some embodiments, if the feedback information is carried by the at least one modulation symbol, each modulation symbol is repeatedly mapped to the plurality of PRBs. Alternatively, each modulation symbol is repeatedly mapped to the same RE of the plurality of PRBs, and the RE here is a RE in the plurality of PRBs that is not occupied by other information, such as a RE that is not occupied by DMRS. That is, for the i-th modulation symbol, it is mapped to the i-th RE of the j-th PRB, where $0 \leq i < N-M$, and $0 \leq j < F$. Preferably, i is an index of the i-th RE on the j-th PRB that can be used for transmission of the PSFCH modulation symbol.

Exemplarily, the feedback information is carried by two modulation symbols, F=5. Then, for the 0-th modulation symbol, it is mapped to the 0-th RE of the 0-th PRB, the 0-th RE of the 1st PRB, the 0-th RE of the 2nd PRB, the 0-th RE of the 3rd PRB, and the 0-th RE of the 4th PRB. For the 1st modulation symbol, it is mapped to the 1st RE of the 0-th PRB, the 1st RE of the 1st PRB, the 1st RE of the 2nd PRB, the 1st RE of the 3rd PRB, and the 1st RE of the 4th PRB.

In some embodiments, if the feedback information is carried by the at least one modulation symbol, a bit sequence b (0), ... b($M_{bit}$−1) of the feedback information is scrambled in the following way to generate a bit sequence $\tilde{b}$(0), ... $\tilde{b}$($M_{bit}$−1).

where $\tilde{b}$(n)=(b(n)+c(n))mod 2 where c(n) is determined by the following formulas:

$$c(n) = (x_1(n + N_C) + x_2(n + N_C))\bmod 2$$

$$x_1(n + 31) = (x_1(n + 3) + x_1(n))\bmod 2$$

$$x_2(n + 31) = (x_2(n + 3) + x_2(n + 2) + x_2(n + 1) + x_2(n))\bmod 2$$

where n=0, 1, ..., $M_{PN}$−1, $N_C$=1600, and $M_{PN}$ represents a length of c(n).

A first m-sequence $x_1$(n) is initialized by $x_1$(0)=1, $x_1$(n) =0, n=1,2, ..., 30.

A second m-sequence $x_2$ (n) is initialized by , $$c_{init} = \sum_{i=0}^{30} x_2(i) \cdot 2^i,$$

where $c_{init}$=$n_{RNTI}$·$2^{15}$+$n_{ID}$, a first identity $n_{RNTI}$ is a source identity (ID) configured by the network device for the first terminal, or a member identity configured by the central control node to the first terminal. A value range of a second identity $n_{ID}$ is {0, 1, ..., 1023}, and $n_{ID}$ may be an identity of the transmitting terminal sending the PSSCH. If the first terminal is controlled by the central control node, $n_{ID}$ may be an identity of the central control node or a scrambling identity.

In some embodiments, if the feedback information is carried by the at least one modulation symbol, a sequence corresponding to the DMRS sent together with the feedback information generates a DMRS sequence based on a pseudo-random sequence c(n).

In this case, the DMRS sequence corresponds to $$c_{init} = \left(2^{17}\left(N_{symb}^{slot}n_{s,f}^{\mu} + l + 1\right)(2N_{ID} + 1) + 2N_{ID}\right)\bmod 2^{31},$$

where $$N_{symb}^{slot}$$

represents the number of OFDM symbols contained in one slot, $$n_{x,f}^{\mu}$$

represents an index in the entire system frame of a slot where the DMRS is located, μ represents an index of a sub-carrier space Δf of the DMRS, a relationship between Δf and μ is shown in Table 3 as below,

TABLE 3

| μ | Δf = $2^{\mu}$ · 15 [kHz] |
|---|---|
| 0 | 15 |
| 1 | 30 |
| 2 | 60 |
| 3 | 120 |
| 4 | 240 |
| 5 | 480 |
| 6 | 960 | and l represents an index in the slot of the OFDM symbol where the DMRS is located.

In some embodiments, $N_{ID}$ is the source identity configured by the network device for the first terminal, or the member identity configured by the central control node for the first terminal, or an identity configured by the central control node or the network device and dedicated to DMRS scrambling.

In some embodiments, the plurality of PRBs form one interleaved resource, and the number of PRBs of the plurality of PRBs is configured or preconfigured by the central control node or the network device, or predefined by a standard; and/or, positions in frequency domain of the plurality of PRBs are configured or preconfigured by the central control node or the network device, or predefined by a standard. For example, F PRBs in one interleaved resource may be F PRBs with a starting point of f (that is, the f-th PRB) and an interval of k, where $0 \leq f < k-1$, F may be the largest integer that guarantees $f+F*k$ being not greater than W, floor(•) represents the round-down function, and W is the channel bandwidth. A value of k may be configured or preconfigured by the central control node or the network device, or predefined by a standard, and the value of k may be related to the Sub-Carrier Space (SCS). That is, different sub-carrier spaces correspond to different k values. For example, the value of k may be floor(W/3), ceil(W*0.8), 5, 10, or other values, where ceil(•) represents the round-up function. In the example of FIG. 6, k is equal to 2.

In some embodiments, on the same OFDM symbol, the network device or the central control node may simultaneously configure, for the first terminal, the plurality of PRBs used when the feedback information is carried by the symbol sequence, and the plurality of PRBs used when the feedback information is carried by the at least one modulation symbol. In this case, the configured plurality of PRBs that is used when the feedback information is carried by the symbol sequence and the configured plurality of PRBs that is used when the feedback information is carried by the at least one modulation symbol are completely different. That is, the configured plurality of PRBs (i.e., resource set) that is used when the feedback information is carried by the symbol sequence and the configured plurality of PRBs (i.e., resource set) that is used when the feedback information is carried by the at least one modulation symbol consist of different interleaved resources, and there is no overlap between the two sets.

In some embodiments, on the same OFDM symbol, the network device or the central control node may simultaneously configure, for the first terminal, the plurality of PRBs used when the feedback information is transmitted and at least one PRB used for transmission of the physical sidelink shared channel. In this case, the configured plurality of PRBs used for transmission of the feedback information and the configured at least one PRB used for transmission of the physical sidelink shared channel are completely different. That is, the plurality of PRBs (i.e., resource set) used for transmission of the feedback information and the at least one PRB (i.e., resource set) used for transmission of the physical sidelink shared channel consist of different interleaved resources, and there is no overlap between the two sets.

In some embodiments, if the second terminal is not the central control node, that is, the first terminal sends the feedback information to the ordinary terminal, a first time length for performing AGC exists or does not exist before the OFDM symbol carrying the feedback information.

In some embodiments, if the second terminal is not the central control node, there is a second time length before the first time length. The second time length is a guard period, and the first terminal and the second terminal do not send any signal during the second time length.

In some embodiments, if the second terminal is the central control node, that is, the first terminal sends the feedback information to the central control node, the OFDM symbol used to transmit the feedback information is located within a time domain resource range of a MH link from the first terminal to the second terminal, or the plurality of PRBs used to carry the feedback information are located within a frequency domain resource range of a MH link from the first terminal to the second terminal, and there is no first time length before the OFDM symbol used to transmit the feedback information. There may also be no second time length.

In some embodiments, the first terminal has the same transmit power as the data symbol during the first time length.

In some embodiments, the first time length may be one OFDM symbol or less than one OFDM symbol. The first time length may be configured or preconfigured by the central control node or the network device, or predefined by a standard.

In some embodiments, the second time length may be one OFDM symbol or less than one OFDM symbol. The second time length may be configured or preconfigured by the central control node or the network device, or predefined by a standard.

In Possible Implementation 2, the feedback information is carried by the plurality of PRBs, and the feedback information is carried by the symbol sequence or the at least one modulation symbol.

In some embodiments, if the feedback information is carried by the symbol sequence, the length of the symbol sequence is N*F. If the feedback information is carried by the at least one modulation symbol, the number of the at least one modulation symbol is (N−M)*F. N is the number of REs in one PRB, M is the number of REs occupied by the DMRS in one PRB, and F is the number of PRBs of the plurality of PRBs.

In some embodiments, if the feedback information is carried by the symbol sequence, the number of feedback information bits carried on each PRB is ceil(Mbit/F), and for the i-th PRB of the plurality of PRBs, the floor(i*Mbi/F)-th feedback information bit is carried, where ceil( ) is the round-up function, Mbit is the number of feedback information bits included in the feedback information, F is the number of PRBs of the plurality of PRBs, and i is an integer.

Figure 7:
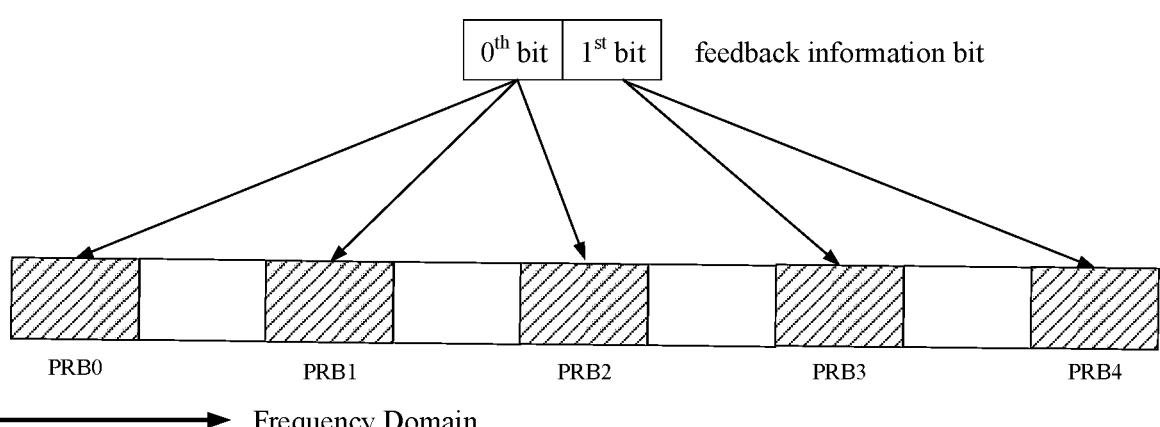
FIG. 7 is a schematic diagram of a mapping relationship between a feedback information bit and a PRB provided by an embodiment of the present disclosure.

In some embodiments, the feedback information bits of the feedback information carried on the plurality of PRBs are not exactly the same. For example, FIG. 7 is a schematic diagram of a mapping relationship between a feedback information bit and a PRB provided by an embodiment of the present disclosure. As shown in FIG. 7, one interleaved resource includes five PRBs, that is, F=5, and the feedback information includes two feedback information bits, that is, Mbit=2. Through the calculation by the above formula, the 0-th feedback information bit is carried on PRB 0, PRB 1 and PRB 2 in the interleaved resource, and the 1st feedback information bit is carried on PRB 3 and PRB 4 in the interleaved resource.

Figure 8:
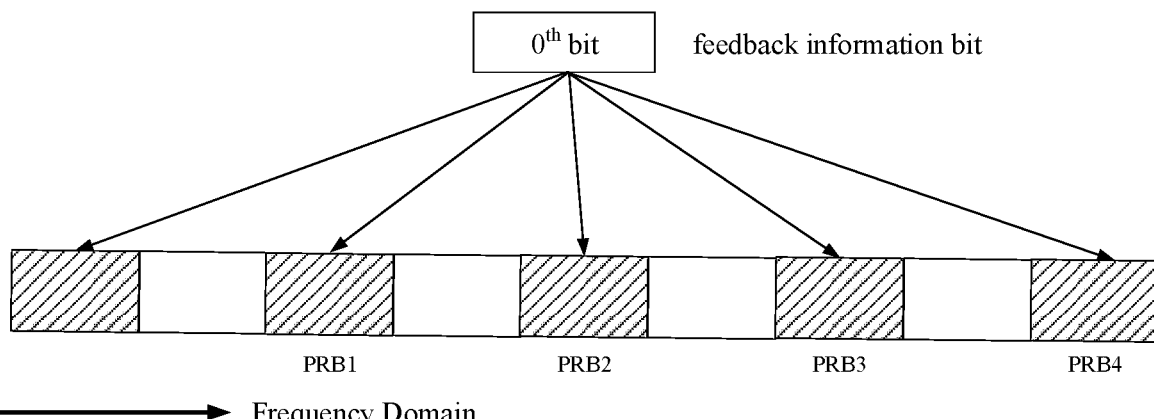
FIG. 8 is a schematic diagram of a mapping relationship between a feedback information bit and a PRB provided by another embodiment of the present disclosure.

In some embodiments, the feedback information bits of the feedback information carried on the plurality of PRBs are exactly the same. For example, FIG. 8 is a schematic diagram of a mapping relationship between a feedback information bit and a PRB provided by another embodiment of the present disclosure. As shown in FIG. 8, one interleaved resource includes five PRBs, that is, F=5, and the feedback information includes one feedback information bit, that is, Mbit=1. Through the calculation by the above formula, the 0-th feedback information bit is carried on PRB 0-4 in the interleaved resource.

In some embodiments, if the feedback information is carried by the at least one modulation symbol, the number of feedback information bits carried on the plurality of PRBs is $Q*(N-M)*F$; where N is the number of REs in one PRB, M is the number of REs occupied by the DMRS in one PRB, and F is the number of PRBs of the plurality of PRBs. Q is related to the modulation mode used on the channel where the feedback information is located. For BPSK, QPSK, 16QAM, and 64QAM modulation modes, the values of Q are 1, 2, 4, and 8, respectively.

In some embodiments, if the feedback information is carried by the at least one modulation symbol, for the scrambling mode of the bit sequence of the feedback information and the way for generating the DMRS sequence, reference may be made to the foregoing Implementation 1, which will not be repeated in the present disclosure.

In some embodiments, the plurality of PRBs form one interleaved resource, and the number of PRBs of the plurality of PRBs is configured or preconfigured by the central control node or the network device, or predefined by a standard; and/or, positions in frequency domain of the plurality of PRBs are configured or preconfigured by the central control node or the network device, or predefined by a standard. For example, F PRBs in one interleaved resource may be F PRBs with a starting point of f (that is, the f-th PRB) and an interval of k, where $0 \le f < k-1$, F may be the largest integer that guarantees $f+F*k$ being not greater than W, floor($\cdot$) represents the round-down function, and W is the channel bandwidth. A value of k may be configured or preconfigured by the central control node or the network device, or predefined by a standard, and the value of k may be related to the Sub-Carrier Space (SCS). That is, different sub-carrier spaces correspond to different k values. For example, the value of k may be floor(W/3), ceil(W*0.8), 5, 10, or other values, where ceil($\cdot$) represents the round-up function. In the example of FIG. 6, k is equal to 2.

In some embodiments, on the same OFDM symbol, the network device or the central control node may simultaneously configure, for the first terminal, the plurality of PRBs used when the feedback information is carried by the symbol sequence, and the plurality of PRBs used when the feedback information is carried by the at least one modulation symbol. In this case, the configured plurality of PRBs that are used when the feedback information is carried by the symbol sequence and the configured plurality of PRBs that are used when the feedback information is carried by the at least one modulation symbol are completely different. That is, the configured plurality of PRBs (i.e., resource set) that is used when the feedback information is carried by the symbol sequence and the configured plurality of PRBs (i.e., resource set) that is used when the feedback information is carried by the at least one modulation symbol consist of different interleaved resources, and there is no overlap between the two sets.

In some embodiments, on the same OFDM symbol, the network device or the central control node may simultaneously configure, for the first terminal, the plurality of PRBs used when the feedback information is transmitted and at least one PRB used for transmission of the physical sidelink shared channel. In this case, the configured plurality of PRBs used for transmission of the feedback information and the configured at least one PRB used for transmission of the physical sidelink shared channel are completely different. That is, the plurality of PRBs (i.e., resource set) used for transmission of the feedback information and the at least one PRB (i.e., resource set) used for transmission of the physical sidelink shared channel consist of different interleaved resources, and there is no overlap between the two sets.

In some embodiments, if the second terminal is not the central control node, that is, the first terminal sends the feedback information to the ordinary terminal, a first time length for performing AGC exists or does not exist before the OFDM symbol carrying the feedback information.

In some embodiments, if the second terminal is not the central control node, a second time length exists before the first time length. The second time length is a guard period, and the first terminal and the second terminal do not send any signal during the second time length.

In some embodiments, if the second terminal is the central control node, that is, the first terminal sends the feedback information to the central control node, the OFDM symbol used to transmit the feedback information is located within a time domain resource range of a MH link from the first terminal to the second terminal, or the plurality of PRBs used to carry the feedback information are located within a frequency domain resource range of a MEI link from the first terminal to the second terminal, and there is no first time length before the OFDM symbol used to transmit the feedback information. There may also be no second time length.

In some embodiments, the first terminal has the same transmit power as the data symbol during the first time length.

In some embodiments, the first time length may be one OFDM symbol or less than one OFDM symbol. The first time length may be configured or preconfigured by the central control node or the network device, or predefined by a standard.

In some embodiments, the second time length may be one OFDM symbol or less than one OFDM symbol. The second time length may be configured or preconfigured by the central control node or the network device, or predefined by a standard.

In Possible Implementation 3, the feedback information is carried by one PRB, the feedback information is carried by the symbol sequence or the at least one modulation symbol, and the first terminal maps the feedback information to the plurality of PRBs according to the indication information sent by the central control node or the network device.

In some embodiments, if the feedback information is carried by the symbol sequence, a length of the symbol sequence is N. If the feedback information is carried by the at least one modulation symbol, the number of the at least one modulation symbol is N–M. N is the number of Resource Elements (REs) in one PRB, and M is the number of REs occupied by the Demodulation Reference Signal (DMRS) in one PRB.

In some embodiments, if the feedback information is carried by the symbol sequence, the sequence carrying the feedback information is mapped onto the plurality of PRBs in one of the following ways.

In a first way, the symbol sequence corresponding to the feedback information is repeatedly mapped to the plurality of PRBs, that is, as shown in FIG. 6. The i-th symbol in the symbol sequence is mapped to the i-th RE of the j-th PRB, where $0 \le i < N$, $0 \le j < F$, and F is the number of PRBs of the plurality of PRBs.

In a second way, the symbol sequence corresponding to the feedback information is subject to different cyclic shifts to obtain different cyclic shift sequences, and the different cyclic shift sequences are mapped onto different PRBs of the plurality of PRBs. Meanings represented by these different cyclic shift sequences on the different PRBs are the same. That is, the mod $(i+j*\Delta,N)$-th symbol in an original symbol sequence is mapped to the i-th RE of the j-th PRB in the plurality of PRBs, where mod( ) is a remainder function, $0 \le i < N$, $0 \le j < F$, i and j are both integers, and F, N have the same meanings as the above-mentioned F, N respectively, which will not be repeated in the present disclosure. A is a specific value.

In some embodiments, Δ is configured or preconfigured by the central control node or the network device, or predefined by a standard.

Exemplarily, if N=5, F=2, and Δ=2, a mapping situation of the original symbol sequence on two PRBs is described by Table 1.

It can be seen from Table 1 that the symbol sequence carried on PRB 0 is 0,1,2,3,4. The symbol sequence carried on PRB 1 is 2,3,4,0,1. The meaning represented by 0,1,2,3,4 on PRB 0 is the same as the meaning represented by 2,3,4,0,1 on PRB 1. For example, they both represent HARQ ACK.

In a third way, the symbol sequence corresponding to the feedback information is subject to a specific cyclic shift to obtain a specific cyclic shift sequence, and the specific cyclic shift sequence is mapped to different PRBs of the plurality of PRBs. The specific cyclic shift sequence has the same meaning on the different PRBs. That is, the mod(i+δ,N)-th symbol in the symbol sequence is mapped to the i-th RE of the j-th PRB in the plurality of PRBs, where mod( ) is the remainder function, $0 \leq i < N$, $0 \leq j < F$, i and j are both integers, F is the number of PRBs of the plurality of PRBs, N is the length of the symbol sequence, and δ is a specific value.

In some embodiments, δ is configured or preconfigured by the central control node or the network device, or predefined by a standard.

Exemplarily, if N=5, F=2, and δ=2, the mapping situation of the original symbol sequence on two PRBs is described by Table 2.

It can be seen from Table 2 that the symbol sequence carried on PRB 0 is 2,3,4,0,1. The symbol sequence carried on PRB 1 is 2,3,4,0,1. The meaning represented by 2,3,4,0,1 on PRB 0 is the same as the meaning represented by 2,3,4,0,1 on PRB 1. For example, they both represent HARQ ACK.

Alternatively, the original symbol sequence is subject to the specific cyclic shift to obtain the specific cyclic shift sequence, and the specific cyclic shift sequence and the original symbol sequence are mapped to different PRBs of the plurality of PRBs. The original symbol sequence and the specific cyclic shift sequence have the same meaning on the different PRBs. For example, the original symbol sequence is 0,1,2,3,4, and the original symbol sequence is subject to one specific cyclic shift to obtain the specific cyclic shift sequence 2,3,4,0,1. 0,1,2,3,4 is transmitted on PRB 0, and 2,3,4,0,1 is transmitted on PRB 1. The meaning represented by 0,1,2,3,4 on PRB 0 and the meaning represented by 2,3,4,0,1 on PRB 1 are both HARQ ACK.

In some embodiments, if the feedback information is carried by the at least one modulation symbol, each modulation symbol is repeatedly mapped to the plurality of PRBs. Alternatively, each modulation symbol is repeatedly mapped to the same RE of the plurality of PRBs, and the RE here is a RE in the plurality of PRBs that is not occupied by other information, such as a RE that is not occupied by the DMRS. That is, for the i-th modulation symbol, it is mapped to the i-th RE of the j-th PRB, where $0 \leq i < N-M$, and $0 \leq j < F$. Preferably, i is an index on the entire PRB of the i-th RE on the j-th PRB that can be used for transmission of the PSFCH modulation symbol.

In some embodiments, if the feedback information is carried by the at least one modulation symbol, for the scrambling mode of the bit sequence of the feedback information and the way for generating the DMRS sequence, reference may be made to the foregoing Implementation 1, which will not be repeated in the present disclosure.

In some embodiments, F1 PRBs form one interleaved resource, and each interleaved resource has a unique resource index. F1 is an integer greater than or equal to 1. The above-mentioned indication information is used to indicate the number R of the interleaved resources occupied by the feedback information. That is, F=R*F1, and F is the number of PRBs of the plurality of PRBs.

In some embodiments, F1 is configured or preconfigured by the central control node or the network device, or predefined by a standard; and/or, positions in frequency domain of the interleaved resource is configured or preconfigured by the central control node or the network device, or predefined by a standard. For example, F1 PRBs in one interleaved resource may be F1 PRBs with a starting point off and an interval of k, where $0 \leq f < k-1$, F1 may be the largest integer that guarantees f+F1*k being not greater than W, floor(•) represents the round-down function, and W is the channel bandwidth. A value of k may be configured or preconfigured by the central control node or the network device, or predefined by a standard, and the value of k may be related to the SCS. That is, different sub-carrier spaces correspond to different k values. For example, the value of k may be floor(W/3), ceil(W*0.8), 5, 10, or other values, where ceil(•) represents the round-up function.

Exemplarily, FIG. 9 is a schematic diagram of feedback information occupying an interleaved resource provided by the present disclosure. As shown in FIG. 9, one interleaved resource includes 3 PRBs, that is, F1=3. For example, PRB 0, PRB 3 and PRB 6 constitute one interleaved resource; PRB 1, PRB 4 and PRB 7 constitute one interleaved resource; and PRB 2, PRB 5 and PRB 8 constitute one interleaved resource. The feedback information currently occupies two interleaved resources, that is, R=2. The two interleaved resources are the interleaved resource formed by PRB 1, PRB 4 and PRB 7, and the interleaved resource formed by PRB 2, PRB 5 and PRB 8. In this case, F=6.

In some embodiments, starting points in frequency domain of the R interleaved resources are adjacent. As shown in FIG. 9, a starting point in frequency domain of the interleaved resource composed of PRB 0, PRB 3 and PRB 6 is PRB 0; a starting point in frequency domain of the interleaved resource composed of PRB 1, PRB 4 and PRB 7 is PRB 1; and a starting point in frequency domain of the interleaved resource composed of PRB 2, PRB 5 and PRB 8 is PRB 2. PRB 0, PRB 1 and PRB 2 are adjacent in frequency domain.

In some embodiments, a value of R is configured or preconfigured by the central control node or the network device, or predefined by a standard.

In some embodiments, when scheduling PSSCH transmission, the central control node or the network device simultaneously indicates the number R of the interleaved resources occupied by the feedback information.

In some embodiments, the central control node or the network device may determine R according to the number of terminal devices that send the feedback information on one OFDM symbol. Thus, it is ensured that the signal power on the OFDM symbol where the feedback information is located is greater than a certain value, thereby avoiding the channel being preempted by other terminals operating on the same shared frequency band.

In some embodiments, the greater the number of terminal devices that send the feedback information on one OFDM symbol, the larger R is. The central control node or the network device may configure a relationship between the number of terminal devices that send the feedback information on one OFDM symbol and R. It is assumed that the number of terminal devices sending the feedback information on one OFDM symbol is P. Exemplarily, a correspondence between P and R configured by the central control node or the network device is shown in Table 4 as below.

TABLE 4

| P | R |
| --- | --- |
| 1 | 1 |
| 2 | 2 |
| 3 | 3 |
| 4 | 4 |

In some embodiments, the plurality of PRBs form one interleaved resource, and the indication information is used to indicate an interval in terms of PRBs between consecutive PRBs of the interleaved resource. The number F of PRBs of the plurality of PRBs is configured or preconfigured by the central control node or the network device, or predefined by a standard; and/or, positions in frequency domain of the plurality of PRBs are configured or preconfigured by the central control node or the network device, or predefined by a standard.

Exemplarily, F PRBs in one interleaved resource may be F PRBs with a starting point off and an interval of $k^*r$, where the interval in terms of PRBs between consecutive PRBs of the interleaved resource indicated by the indication information is represented by r, $0 \leq f < k^*r-1$, F may be the largest integer that guarantees $f+F^*k^*r$ being not greater than W, floor($\cdot$) represents the round-down function, and W is the channel bandwidth.

In some embodiments, a value of k may be configured or preconfigured by the central control node or the network device, or predefined by a standard, and the value of k may be related to the Sub-Carrier Space (SCS). That is, different sub-carrier spaces correspond to different k values.

In some embodiments, the interval r in terms of PRBs between consecutive PRBs of in the interleaved resource is configured or preconfigured by the central control node or the network device, or predefined by a standard.

In some embodiments, the central control node or the network device may determine r according to the number of terminal devices that send the feedback information on one OFDM symbol. Thus, it is ensured that the signal power on the OFDM symbol where the feedback information is located is greater than a certain value, thereby avoiding the channel being preempted by other terminals operating on the same shared frequency band.

In some embodiments, the greater the number of terminal devices that send the feedback information on one OFDM symbol, the larger R is.

In some embodiments, on the same OFDM symbol, the network device or the central control node may simultaneously configure, for the first terminal, the plurality of PRBs used when the feedback information is carried by the symbol sequence, and the plurality of PRBs used when the feedback information is carried by the at least one modulation symbol. In this case, the configured plurality of PRBs that is used when the feedback information is carried by the symbol sequence and the configured plurality of PRBs that is used when the feedback information is carried by the at least one modulation symbol are completely different. That is, the configured plurality of PRBs (i.e., resource set) that is used when the feedback information is carried by the symbol sequence and the configured plurality of PRBs (i.e., resource set) that is used when the feedback information is carried by the at least one modulation symbol consist of different interleaved resources, and there is no overlap between the two sets.

In some embodiments, on the same OFDM symbol, the network device or the central control node may simultaneously configure, for the first terminal, the plurality of PRBs used when the feedback information is transmitted and at least one PRB used for transmission of the physical sidelink shared channel. In this case, the configured plurality of PRBs used for transmission of the feedback information and the configured at least one PRB used for transmission of the physical sidelink shared channel are completely different. That is, the plurality of PRBs (i.e., resource set) used for transmission of the feedback information and the at least one PRB (i.e., resource set) used for transmission of the physical sidelink shared channel consist of different interleaved resources, and there is no overlap between the two sets.

In some embodiments, if the second terminal is not the central control node, that is, the first terminal sends the feedback information to the ordinary terminal, a first time length for performing AGC exists or does not exist before the OFDM symbol carrying the feedback information.

In some embodiments, if the second terminal is not the central control node, a second time length exists before the first time length. The second time length is a guard period, and the first terminal and the second terminal do not send any signal during the second time length.

In some embodiments, if the second terminal is the central control node, that is, the first terminal sends the feedback information to the central control node, the OFDM symbol used to transmit the feedback information is located within a time domain resource range of a MH link from the first terminal to the second terminal, or the plurality of PRBs used to carry the feedback information are located within a frequency domain resource range of a MEI link from the first terminal to the second terminal, and there is no first time length before the OFDM symbol used to transmit the feedback information. There may also be no second time length.

In some embodiments, the first terminal has the same transmit power as the data symbol during the first time length.

In some embodiments, the first time length may be one OFDM symbol or less than one OFDM symbol. The first time length may be configured or preconfigured by the central control node or the network device, or predefined by a standard.

In some embodiments, the second time length may be one OFDM symbol or less than one OFDM symbol. The second time length may be configured or preconfigured by the central control node or the network device, or predefined by a standard.

In summary, in the present disclosure, the first terminal sends the feedback information on the plurality of PRBs in the unlicensed frequency band, so that the feedback information occupies a certain proportion of the channel bandwidth in frequency domain, thereby ensuring the normal transmission of the feedback information, and realizing the application of the sidelink communication on the unlicensed frequency band. Further, in the above-mentioned Implementation 1, the first terminal can map the feedback information that only occupies one PRB to the plurality of PRBs, so that the feedback information occupies a certain proportion of the channel bandwidth in frequency domain, thereby avoiding the unlicensed spectrum resource from being preempted by other terminals. In the above-mentioned Implementation 2, the feedback information is carried by the plurality of PRBs. That is, the number of REs occupied by the feedback information increases. This is conducive to increasing the number of bits that can be carried in the feedback information, thereby facilitating to support the transmission of more feedback information. In the above-mentioned Implementation 3, the central control node or the network device may dynamically adjust the number of interleaved resources occupied by the feedback information according to the number of terminals that simultaneously send the feedback information on one OFDM symbol, or adjust the interval in terms of PRBs between consecutive PRBs of the interleaved resource, so as to avoid excessive waste of the resource while ensuring the effective occupation of the resource on the unlicensed spectrum.

The method embodiments of the present disclosure are described in detail above in combination with FIGS. 5 to 9, and the device embodiments of the present disclosure are described in detail below in combination with FIGS. 10 to 13. It should be understood that the device embodiments and the method embodiments correspond to each other, and for the similar description, reference may be made to the method embodiments.

FIG. 10 shows a schematic block diagram of a terminal device 400 according to an embodiment of the present disclosure. As shown in FIG. 10, the terminal device 400 includes: a communication unit 410, configured to send feedback information to a second terminal on a plurality of Physical Resource Blocks (PRBs) in an unlicensed frequency band.

In some embodiments, the feedback information is carried by one PRB, and the feedback information is carried by a symbol sequence or at least one modulation symbol. The terminal device further includes: a processing unit 420, configured to map the feedback information to the plurality of PRBs.

In some embodiments, the feedback information is carried by the plurality of PRBs, and the feedback information is carried by a symbol sequence or at least one modulation symbol.

In some embodiments, the feedback information is carried by one PRB, and the feedback information is carried by a symbol sequence or at least one modulation symbol. The terminal device further includes: a processing unit 420, configured to map the feedback information to the plurality of PRBs according to indication information sent by a central control node or a network device.

In some embodiments, if the feedback information is carried by the symbol sequence, a length of the symbol sequence is N. If the feedback information is carried by the at least one modulation symbol, the number of the at least one modulation symbol is N–M. N is the number of Resource Elements (REs) in one PRB, and M is the number of REs occupied by a Demodulation Reference Signal (DMRS) in one PRB.

In some embodiments, the symbol sequence is repeatedly mapped onto the plurality of PRBs.

In some embodiments, the symbol sequence is subject to different cyclic shifts to obtain different cyclic shift sequences. The different cyclic shift sequences are mapped onto different PRBs of the plurality of PRBs.

In some embodiments, a mod (i+j*Δ,N)-th symbol in the symbol sequence is mapped to a i-th RE of a j-th PRB in the plurality of PRBs, where mod( ) is a remainder function, $0 \leq i < N$, $0 \leq j < F$, i and j are both integers, F is the number of PRBs of the plurality of PRBs, N is the length of the symbol sequence, and A is a specific value.

In some embodiments, Δ is configured or preconfigured by the central control node or the network device, or predefined by a standard.

In some embodiments, the symbol sequence is subject to a specific cyclic shift to obtain a specific cyclic shift sequence. The specific cyclic shift sequence is mapped onto different PRBs of the plurality of PRBs. Alternatively, the specific cyclic shift sequence and the symbol sequence are mapped onto different PRBs of the plurality of PRBs.

In some embodiments, a mod(i+δ,N)-th symbol in the symbol sequence is mapped to a i-th RE of a j-th PRB in the plurality of PRBs, where mod( ) is a remainder function, $0 \leq i < N$, $0 \leq j < F$, i and j are both integers, F is the number of PRBs of the plurality of PRBs, N is the length of the symbol sequence, and δ is a specific value.

In some embodiments, δ is configured or preconfigured by the central control node or the network device, or predefined by the standard.

In some embodiments, each modulation symbol is repeatedly mapped onto the plurality of PRBs.

In some embodiments, each modulation symbol is repeatedly mapped onto the same RE of the plurality of PRBs.

In some embodiments, the RE is a RE in the plurality of PRBs that is not occupied by other information.

In some embodiments, if the feedback information is carried by the symbol sequence, a length of the symbol sequence is N*F. If the feedback information is carried by the at least one modulation symbol, the number of the at least one modulation symbol is (N–M)*F. N is the number of REs in one PRB, M is the number of REs occupied by a DMRS in one PRB, and F is the number of PRBs of the plurality of PRBs.

In some embodiments, feedback information bits of the feedback information carried on the plurality of PRBs are not exactly identical.

In some embodiments, if the feedback information is carried by the symbol sequence, the number of feedback information bits carried on each PRB is ceil(Mbit/F), and for a i-th PRB in the plurality of PRBs, a floor(i*Mbit/F)-th feedback information bit is carried. Ceil( ) is a round-up function, floor( ) is a round-down function, Mbit is the number of feedback information bits included in the feedback information, F is the number of PRBs of the plurality of PRBs, $0 \leq i < F$, and i is an integer.

In some embodiments, if the feedback information is carried by the at least one modulation symbol, the number of feedback information bits carried on the plurality of PRBs is Q*(N–M)*F. Q is related to a modulation mode used on a channel where the feedback information is located, N is the number of REs in one PRB, M is the number of REs occupied by the DMRS in one PRB, and F is the number of PRBs of the plurality of PRBs.

In some embodiments, one interleaved resource is formed by F1 PRBs, where F1 is an integer greater than or equal to 1. The indication information is used to indicate the number R of the interleaved resources occupied by the feedback information.

In some embodiments, F1 is configured or preconfigured by the central control node or the network device, or predefined by the standard; and/or, a position in frequency domain of the interleaved resource is configured or preconfigured by the central control node or the network device, or predefined by the standard.

In some embodiments, starting points of R interleaved resources are adjacent in frequency domain.

In some embodiments, R is determined according to the number of terminals sending the feedback information on one data symbol.

In some embodiments, one interleaved resource is formed by the plurality of PRBs, and the indication information is used to indicate an interval in terms of PRBs between consecutive PRBs of the interleaved resource.

In some embodiments, the interval in terms of PRBs between consecutive PRBs of the interleaved resource is configured or preconfigured by the central control node or the network device, or predefined by the standard.

In some embodiments, the interval in terms of PRBs between consecutive PRBs of the interleaved resource is determined according to the number of terminals sending the feedback information on one data symbol.

In some embodiments, the number of PRBs of the plurality of PRBs is configured or preconfigured by the central control node or the network device, or predefined by the standard; and/or, positions in frequency domain of the plurality of PRBs are configured or preconfigured by the central control node or the network device, or predefined by the standard.

In some embodiments, on the same data symbol, a plurality of PRBs configured for use when the feedback information is carried by the symbol sequence and a plurality of PRBs configured for use when the feedback information is carried by the at least one modulation symbol are completely different.

In some embodiments, on the same data symbol, the plurality of PRBs configured to send the feedback information and at least one PRB configured to send the physical sidelink shared channel are completely different.

In some embodiments, if the second terminal is not the central control node, a first time length exists or does not exist before the data symbol. If the second terminal is the central control node, the data symbol is located within a time domain resource range of a MH link from the terminal device to the second terminal, or the plurality of PRBs is located within a frequency domain resource range of the MH link from the terminal device to the second terminal, and the first time length does not exist before the data symbol. The first time length is a time length for automatic gain control.

In some embodiments, if the second terminal is not the central control node, a second time length exists before the first time length. If the second terminal is the central control node, the second time length does not exist. The second time length is a guard period, and no signal is sent by the terminal device and the second terminal within the second time length.

In some embodiments, the terminal device has the same transmit power as the data symbol during the first time length.

In some embodiments, the second time length is configured or preconfigured by the central control node or the network device, or predefined by the standard.

In some embodiments, the terminal device further includes: a processing unit 420, configured to initialize a scrambling sequence of a feedback signal according to a first identity and a second identity. The first identity is a source identity configured by the network device for the terminal device, or a member identity configured by the central control node to the terminal device. A value range of the second identity is {0, 1, . . . , 1023}, and the second identity is an identity of a transmitting terminal that sends the physical sidelink shared channel, an identity of the central control node, or a scrambling identity of the central control node.

In some embodiments, each modulation symbol and the Demodulation Reference Signal (DMRS) are sent simultaneously. The terminal device further includes: a processing unit 420, configured to: generate a DMRS sequence according to the source identity configured by the network device for the terminal device; or generate the DMRS sequence according to the member identity configured by the central control node for the terminal device; or generate the DMRS sequence according to an identity configured by the central control node or the network device and dedicated to DMRS scrambling.

In some embodiments, a proportion, occupied by the plurality of PRBs, of an entire bandwidth is greater than or equal to 80%.

In some embodiments, the feedback information includes at least one of the following: Hybrid Automatic Repeat Request (HARQ) information; and Channel State Information (CSI).

In some embodiments, in some embodiments, the aforementioned communication unit may be a communication interface or a transceiver, or an input/output interface of a communication chip or a system-on-chip. The aforementioned processing unit may be one or more processors.

It should be understood that the terminal device 400 according to embodiments of the present disclosure may correspond to the first terminal in the method embodiments of the present disclosure, and the abovementioned and other operations and/or functions of each unit in the terminal device 400 are to implement the method corresponding to the first terminal described above, respectively, and will not be repeated here for brevity.

FIG. 11 shows a schematic block diagram of a terminal device 500 according to an embodiment of the present disclosure. As shown in FIG. 11, the terminal device 500 includes: a communication unit 510, configured to receive feedback information sent by a first terminal on a plurality of Physical Resource Blocks (PRBs) in an unlicensed frequency band.

In some embodiments, the feedback information is carried by one PRB, the feedback information is carried by a symbol sequence or at least one modulation symbol, and the feedback information is mapped to the plurality of PRBs.

In some embodiments, the feedback information is carried by the plurality of PRBs, and the feedback information is carried by a symbol sequence or at least one modulation symbol.

In some embodiments, the feedback information is carried by one PRB, the feedback information is carried by a symbol sequence or at least one modulation symbol, and the feedback information is mapped to the plurality of PRBs according to indication information sent by a central control node or a network device.

In some embodiments, if the feedback information is carried by the symbol sequence, a length of the symbol sequence is N. If the feedback information is carried by the at least one modulation symbol, the number of the at least one modulation symbol is N−M. N is the number of Resource Elements (REs) in one PRB, and M is the number of REs occupied by a Demodulation Reference Signal (DMRS) in one PRB.

In some embodiments, the symbol sequence is repeatedly mapped onto the plurality of PRBs.

In some embodiments, the symbol sequence is subject to different cyclic shifts to obtain different cyclic shift sequences. The different cyclic shift sequences are mapped onto different PRBs of the plurality of PRBs.

23

In some embodiments, a mod $(i+j*\Delta,N)$-th symbol in the symbol sequence is mapped to a i-th RE of a j-th PRB in the plurality of PRBs, where mod( ) is a remainder function, $0 \leq i < N$, $0 \leq j < F$, i and j are both integers, F is the number of PRBs of the plurality of PRBs, N is the length of the symbol sequence, and $\Delta$ is a specific value.

In some embodiments, $\Delta$ is configured or preconfigured by the central control node or the network device, or predefined by the standard.

In some embodiments, the symbol sequence is subject to a specific cyclic shift to obtain a specific cyclic shift sequence. The specific cyclic shift sequence is mapped onto different PRBs of the plurality of PRBs. Alternatively, the specific cyclic shift sequence and the symbol sequence are mapped onto different PRBs of the plurality of PRBs.

In some embodiments, a mod$(i+\delta,N)$-th symbol of the symbol sequence is mapped to a i-th RE of a j-th PRB in the plurality of PRBs, where mod( ) is a remainder function, $0 \leq i < N$, $0 \leq j < F$ i and j are both integers, F is the number of PRBs of the plurality of PRBs, N is the length of the symbol sequence, and $\delta$ is a specific value.

In some embodiments, $\delta$ is configured or preconfigured by the central control node or the network device, or predefined by the standard.

In some embodiments, each modulation symbol is repeatedly mapped onto the plurality of PRBs.

In some embodiments, each modulation symbol is repeatedly mapped onto the same RE of the plurality of PRBs.

In some embodiments, the RE is a RE in the plurality of PRBs that is not occupied by other information.

In some embodiments, if the feedback information is carried by the symbol sequence, a length of the symbol sequence is N*F. If the feedback information is carried by the at least one modulation symbol, the number of the at least one modulation symbol is (N−M)*F. N is the number of REs in one PRB, M is the number of REs occupied by a DMRS in one PRB, and F is the number of PRBs of the plurality of PRBs.

In some embodiments, feedback information bits of the feedback information carried on the plurality of PRBs are not exactly identical.

In some embodiments, if the feedback information is carried by the symbol sequence, the number of feedback information bits carried on each PRB is ceil(Mbit/F), and for a i-th PRB in the plurality of PRBs, a floor(i*Mbit/F)-th feedback information bit is carried. Ceil( ) is a round-up function, floor( ) is a round-down function, Mbit is the number of feedback information bits included in the feedback information, F is the number of PRBs of the plurality of PRBs, $0 \leq i < F$, and i is an integer.

In some embodiments, if the feedback information is carried by the at least one modulation symbol, the number of feedback information bits carried on the plurality of PRBs is Q*(N−M)*F. Q is related to a modulation mode used on a channel where the feedback information is located, N is the number of REs in one PRB, M is the number of REs occupied by the DMRS in one PRB, and F is the number of PRBs of the plurality of PRBs.

In some embodiments, one interleaved resource is formed by F1 PRBs, where F1 is an integer greater than or equal to 1. The indication information is used to indicate the number R of the interleaved resources occupied by the feedback information.

In some embodiments, F1 is configured or preconfigured by the central control node or the network device, or predefined by the standard; and/or, a position in frequency domain of the interleaved resource is configured or preconfigured by the central control node or the network device, or predefined by the standard.

In some embodiments, starting points of R interleaved resources are adjacent in frequency domain.

In some embodiments, R is determined according to the number of terminals sending the feedback information on one data symbol.

In some embodiments, one interleaved resource is formed by the plurality of PRBs, and the indication information is used to indicate an interval in terms of PRBs between consecutive PRBs of the interleaved resource.

In some embodiments, the interval in terms of PRBs between consecutive PRBs of the interleaved resource is configured or preconfigured by the central control node or the network device, or predefined by the standard.

In some embodiments, the interval in terms of PRBs between consecutive PRBs of the interleaved resource is determined according to the number of terminals sending the feedback information on one data symbol.

In some embodiments, the number of PRBs of the plurality of PRBs is configured or preconfigured by the central control node or the network device, or predefined by the standard; and/or, positions in frequency domain of the plurality of PRBs are configured or preconfigured by the central control node or the network device, or predefined by the standard.

In some embodiments, on the same data symbol, a plurality of PRBs configured for use when the feedback information is carried by the symbol sequence and a plurality of PRBs configured for use when the feedback information is carried by the at least one modulation symbol are completely different.

In some embodiments, on the same data symbol, the plurality of PRBs configured to send the feedback information and at least one PRB configured to send the physical sidelink shared channel are completely different.

In some embodiments, if the terminal device is not the central control node, a first time length exists or does not exist before the data symbol. If the terminal device is the central control node, the data symbol is located within a time domain resource range of a MH link from the first terminal to the terminal device, or the plurality of PRBs is located within a frequency domain resource range of the MH link from the first terminal to the terminal device, and the first time length does not exist before the data symbol. The first time length is a time length for automatic gain control.

In some embodiments, if the terminal device is not the central control node, a second time length exists before the first time length. If the terminal device is the central control node, the second time length does not exist. The second time length is a guard period, and no signal is sent by the first terminal and the terminal device within the second time length.

In some embodiments, the second time length is configured or preconfigured by the central control node or the network device, or predefined by the standard.

In some embodiments, a proportion, occupied by the plurality of PRBs, of an entire bandwidth is greater than or equal to 80%.

In some embodiments, the feedback information includes at least one of the following: Hybrid Automatic Repeat Request (HARQ) information; and Channel State Information (CSI).

In some embodiments, the terminal device further includes a processing unit 520, configured to process the received feedback information.

In some embodiments, in some embodiments, the aforementioned communication unit may be a communication interface or a transceiver, or an input/output interface of a communication chip or a system-on-chip. The aforementioned processing unit may be one or more processors.

It should be understood that the terminal device 500 according to embodiments of the present disclosure may correspond to the second terminal in the method embodiments of the present disclosure, and the abovementioned and other operations and/or functions of each unit in the terminal device 500 are to implement the method corresponding to the second terminal described above, respectively, and will not be repeated here for brevity.

Figure 12:
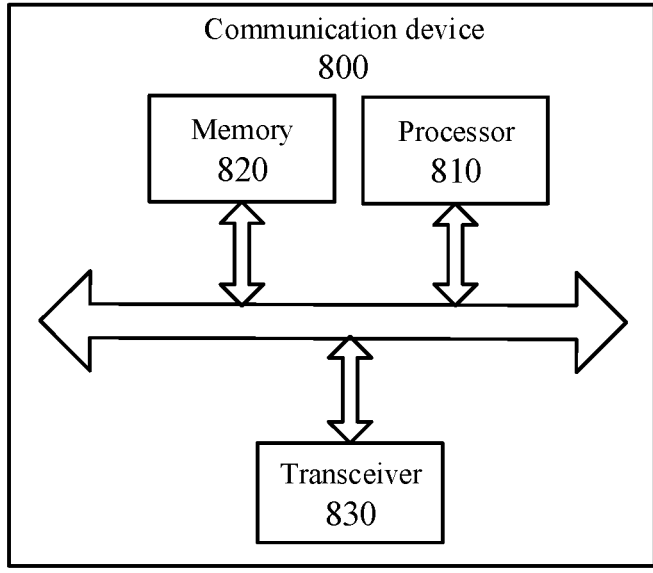
FIG. 12 is a schematic structural diagram of a communication device 800 provided by an embodiment of the present disclosure.

FIG. 12 is a schematic structural diagram of a communication device 800 provided by an embodiment of the present disclosure. The communication device 800 shown in FIG. 8 includes a processor 810. The processor 810 may call a computer program from a memory and run the computer program, to implement the method in embodiments of the present disclosure.

In some embodiments, as shown in FIG. 12, the communication device 800 may further include a memory 820. The processor 810 may call the computer program from the memory 820 and run the computer program, to implement the method in embodiments of the present disclosure.

The memory 820 may be a separate component independent of the processor 810, or may be integrated into the processor 810.

In some embodiments, as shown in FIG. 12, the communication device 800 may further include a transceiver 830. The processor 810 may control the transceiver 830 to communicate with another device. Specifically, the transceiver 830 may transmit information or data to another device, or receive information or data transmitted by another device.

The transceiver 830 may include a transmitter and a receiver. The transceiver 830 may further include an antenna. There may be one or more antennas.

In some embodiments, the communication device 800 may be the terminal device in embodiments of the present disclosure, and the communication device 800 may implement respective procedures performed by the terminal device in various methods according to embodiments of the present disclosure. For brevity, details are not described herein again.

Figure 13:
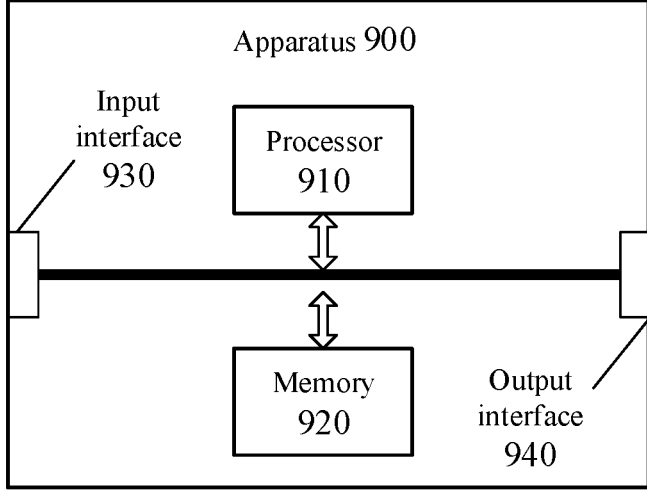
FIG. 13 is a schematic structural diagram of an apparatus according to an embodiment of the present disclosure.

FIG. 13 is a schematic structural diagram of an apparatus 900 according to an embodiment of the present disclosure. The apparatus 900 shown in FIG. 13 includes a processor 910 which can call and run a computer program from a memory to implement the method according to embodiments of the present disclosure.

In some embodiments, as shown in FIG. 13, the apparatus 900 may further include a memory 920. The processor 910 may call and run the computer program from the memory 920 to carry out the method in embodiments of the present disclosure.

The memory 920 may be a separate device independent of the processor 910, or may be integrated in the processor 910.

In some embodiments, the apparatus 900 may further include an input interface 930. The processor 910 may control the input interface 930 to communicate with other devices or chips, and specifically, to acquire information or data transmitted by other devices or chips.

In some embodiments, the apparatus 900 may further include an output interface 940. The processor 910 may control the output interface 940 to communicate with other devices or chips, and specifically, to output information or data to other devices or chips.

In some embodiments, the apparatus may be applied to the terminal device in embodiments of the present disclosure, and the apparatus may implement respective procedures performed by the terminal device in various methods according to embodiments of the present disclosure. For brevity, details are not described herein again.

In some embodiments, the apparatus mentioned in embodiments of the present disclosure may also be a chip, which may be, for example, a system-level chip, a system chip, a chip system, or a system-on-chip.

Figure 14:
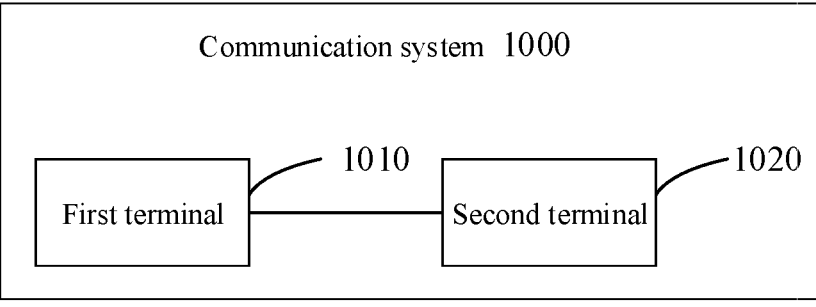
FIG. 14 is a schematic block diagram of a communication system 1000 provided by an embodiment of the present disclosure.

FIG. 14 is a schematic block diagram of a communication system 1000 provided by an embodiment of the present disclosure. As shown in FIG. 14, the communication system 1000 includes a first terminal 1010 and a second terminal 1020.

The first terminal 1010 may be configured to implement respective functions performed by the first terminal in the above method, and the second terminal 1020 may be configured to implement respective functions performed by the second terminal in the above method. For brevity, details are not described herein again.

It is to be understood that the processor in embodiments of the present disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical device, a discrete gate, a transistor logical device, or a discrete hardware component. The processor may implement or execute each method, step and logical block diagram disclosed in embodiments of the present disclosure. The universal processor may be a microprocessor, or the processor may also be any conventional processor and the like. Steps of the method disclosed in combination with embodiments of the present disclosure may be directly embodied as being executed and completed by a hardware decoding processor or executed and completed by a combination of hardware and software modules in the decoding processor. The software module may be located in a mature storage medium in the field, such as a Random Access Memory (RAM), a flash memory, a Read-Only memory (ROM), a Programmable ROM (PROM) or Electrically Erasable PROM (EEPROM) and a register. The storage medium is located in a memory. The processor reads information in the memory, and completes steps of the methods in combination with hardware.

It can be understood that the memory in embodiments of the present disclosure may be a volatile memory or a nonvolatile memory, or may include both the volatile and nonvolatile memories. The nonvolatile memory may be a ROM, a PROM, an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the present disclosure is intended to include, but not limited to, memories of these and any other proper types.

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in embodiments of the present disclosure is intended to include but is not limited to those and any other suitable types of memories.

Embodiments of the present disclosure further provide a computer readable storage medium. The computer readable storage medium is configured to store a computer program.

In some embodiments, the computer readable storage medium may be applied to the terminal device in embodiments of the present disclosure, and the computer program enables a computer to execute respective processes implemented by the terminal device in various methods according to embodiments of the present disclosure. For brevity, details are not described herein again.

Embodiments of the present disclosure further provide a computer program product. The computer program product includes computer program instructions.

In some embodiments, the computer program product may be applied to the terminal device in embodiments of the present disclosure, and the computer program instructions enable the computer to execute respective processes implemented by the terminal device in various methods according to embodiments of the present disclosure. For brevity, details are not described herein again.

Embodiments of the present disclosure further provide a computer program.

In some embodiments, the computer program may be applied to the terminal device in embodiments of the present disclosure. When run on a computer, the computer program enables the computer to execute respective processes implemented by the terminal device in various methods according to embodiments of the present disclosure. For brevity, details are not described herein again.

Those of ordinary skill in the art will appreciate that the exemplary units and algorithm steps described according to embodiments disclosed herein may be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by a person skilled in the art that, for the purpose of convenient and brief description, with respect to a detailed working process of the system, device, and unit, reference may be made to a corresponding process in the foregoing method embodiments. Details are not described herein again.

According to embodiments provided by the present disclosure, it should be understood that the disclosed systems, devices and methods may be implemented in other ways. For example, the device embodiments described above are merely illustrative. For example, the division of units is only a kind of logical function division. In practice, other division may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units. That is, the units may be located in one place, or may be distributed over multiple network units. Some or all of the units may be selected according to actual needs to achieve the objectives of the solutions in embodiments.

In addition, individual functional units in each embodiment of the present disclosure may be integrated in one processing unit, or the units may exist alone physically, or two or more units may be integrated in one unit.

The functions may also be stored in a computer-readable storage medium, if being implemented in the form of software functional unit and sold or used as an independent product. Based on such understanding, the essence of the technical solutions of the present disclosure, or the part contributing to the prior art or part of the technical solutions, may be embodied in the form of software product. The computer software product is stored in a storage medium including a number of instructions, such that a computer device (which may be a personal computer, a server, or a controlling device, etc.) performs all or part of steps of the method described in each embodiment of the present disclosure. The foregoing storage medium includes any medium that is capable of storing program codes, such as a USB disk, a mobile hard disk, a Read-Only Memory (ROM), a Random Access Memory (RAM), a magnetic disk or an optical disk, and the like.

The foregoing descriptions are merely specific embodiments of the present disclosure, but the protection scope of the present disclosure is not limited thereto. Any person skilled in the art can easily think of changes or substitutions within the technical scope disclosed by the present disclosure. Therefore, the protection scope of the present disclosure should be defined by the appended claims.

What is claimed is:

1. A wireless sidelink communication method, comprising:

sending, by a first terminal, Hybrid Automatic Repeat reQuest (HARQ) feedback information to a second terminal on a plurality of Physical Resource Blocks (PRBs) of a Physical Sidelink Feedback Channel (PSFCH) when the sidelink communication operates in an unlicensed frequency band, wherein the HARQ feedback information is carried by one PRB, and the HARQ feedback information is carried by a symbol sequence;

the method further comprises:

mapping, by the first terminal, the HARQ feedback information to the plurality of PRBs;

the symbol sequence is subject to different cyclic shifts to obtain different cyclic shift sequences; and the different cyclic shift sequences are mapped onto different PRBs of the plurality of PRBs.

2. The wireless sidelink communication method according to claim 1, wherein:

the method further comprises:

mapping, by the first terminal, the HARQ feedback information to the plurality of PRBs according to indication information sent by a network device.

3. The wireless sidelink communication method according to claim 1, wherein the symbol sequence is repeatedly mapped onto the plurality of PRBs.

4. The wireless sidelink communication method according to claim 1, wherein:

a mod (i+j*Δ,N)-th symbol in the symbol sequence is mapped to a i-th RE of a j-th PRB in the plurality of PRBs, where, mod( ) is a remainder function, $0 \leq i < N$, $0 \leq j < F$, i and j are both integers, F is the number of PRBs of the plurality of PRBs, N is the length of the symbol sequence, and Δ is a specific value, wherein Δ is predefined by a standard, or configured or preconfigured by a central control node or a network device.

5. The wireless sidelink communication method according to claim 4, wherein:

one interleaved resource is formed by F1 PRBs, where F1 is an integer greater than or equal to 1; and the indication information is used to indicate the number R of the interleaved resources occupied by the HARQ feedback information, wherein F1 is predefined by a standard, or configured or preconfigured by a central control node or a network device; and/or a position in frequency domain of the interleaved resource is predefined by a standard, or configured or preconfigured by a central control node or a network device, wherein starting points of R interleaved resources are adjacent in frequency domain.

6. The wireless sidelink communication method according to claim 2, wherein one interleaved resource is formed by the plurality of PRBs.

7. The wireless sidelink communication method according to claim 6, wherein:

an interval in terms of PRBs between consecutive PRBs of the interleaved resource is predefined by a standard, or configured or preconfigured by a central control node or a network device;

the number of PRBs of the plurality of PRBs is predefined by a standard, or configured or preconfigured by a central control node or a network device; and/or positions in frequency domain of the plurality of PRBs are predefined by a standard, or configured or preconfigured by the central control node or the network device.

8. A wireless sidelink communication method, comprising:

receiving, by a second terminal, Hybrid Automatic Repeat reQuest (HARQ) feedback information sent by a first terminal on a plurality of Physical Resource Blocks (PRBs) of a Physical Sidelink Feedback Channel (PSFCH) when the sidelink communication operates in an unlicensed frequency band, wherein the HARQ feedback information is carried by one PRB, the HARQ feedback information is carried by a symbol sequence, and the HARQ feedback information is mapped to the plurality of PRBs;

the symbol sequence is subject to different cyclic shifts to obtain different cyclic shift sequences; and the different cyclic shift sequences are mapped onto different PRBs of the plurality of PRBs.

9. The wireless sidelink communication method according to claim 8, wherein:

the HARQ feedback information is mapped to the plurality of PRBs according to indication information sent by a network device.

10. The wireless sidelink communication method according to claim 9, wherein one interleaved resource is formed by the plurality of PRBs, and/or wherein the interval in terms of PRBs between consecutive PRBs of the interleaved resource is predefined by a standard, or configured or preconfigured by a central control node or a network device.

11. The wireless sidelink communication method according to claim 8, wherein:

the number of PRBs of the plurality of PRBs is predefined by a standard, or configured or preconfigured by a central control node or a network device; and/or positions in frequency domain of the plurality of PRBs are predefined by a standard, or configured or preconfigured by a central control node or a network device.

12. The wireless sidelink communication method according to claim 8, wherein, on a same data symbol, the plurality of PRBs configured to send the HARQ feedback information is completely different from at least one PRB configured to send the physical sidelink shared channel.

13. The wireless sidelink communication method according to claim 8, wherein a proportion, occupied by the plurality of PRBs, of an entire bandwidth is greater than or equal to 80%.

14. A terminal device, comprising: a processor and a memory, wherein the memory is configured to store a computer program, and the processor is configured to call and run the computer program stored in the memory, to perform a wireless sidelink communication method, comprising:

sending Hybrid Automatic Repeat reQuest (HARQ) feedback information to a second terminal on a plurality of Physical Resource Blocks (PRBs) of a Physical Sidelink Feedback Channel (PSFCH) when the sidelink communication operates in an unlicensed frequency band, wherein the HARQ feedback information is carried by one PRB, and the HARQ feedback information is carried by a symbol sequence;

the method further comprises:

mapping the HARQ feedback information to the plurality of PRBs;

the symbol sequence is subject to different cyclic shifts to obtain different cyclic shift sequences; and the different cyclic shift sequences are mapped onto different PRBs of the plurality of PRBs.

* * * * *